May 2, 1939.　　　　G. A. WIKANDER　　　　2,156,416

ANIMAL COMB

Filed May 9, 1938

Inventor
Gustavus A. Wikander
By T. J. Geisler and
F. R. Geisler.
Attorneys

Patented May 2, 1939

2,156,416

UNITED STATES PATENT OFFICE 2,156,416

ANIMAL COMB

Gustavus A. Wikander, Portland, Oreg.

Application May 9, 1938, Serial No. 206,811

8 Claims. (Cl. 119—87)

My invention relates to combs of the type used for animals, such as dogs, with which it is desired to remove fleas and other insects from the hair or fur of the animal. The main difficulty with ordinary combs used for this purpose is that, while the fleas and other insects will be collected on the comb, such insects will jump back into the animal's fur the moment the comb is lifted from contact with the animal.

Various insect traps have been devised for the purpose of catching the insects disturbed or collected in the combing of the animal's fur, but these devices for the most part are cumbersome, complicated, impractical, or difficult to manipulate.

The object of my invention is to provide a simple efficient insect catcher attached to an animal comb which will permit the comb to be used in the ordinary manner, but which will automatically hold the insects collected on the comb, when the comb is removed from contact with the skin of the animal, thereby permitting the comb to be dipped into water or other suitable liquid solution for removing and destroying the insects collected.

The manner in which I accomplish my object and the construction and operation of the means which I employ for this purpose in combination with an animal comb will be described with reference to the accompanying drawing.

In the drawing, Fig. 1 is a plan view of my invention;

Figure 1:
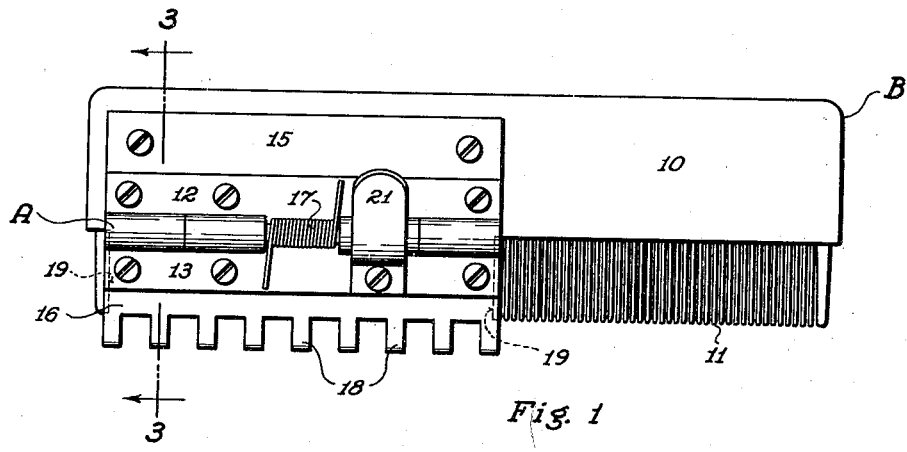

The comb, which is indicated by B, comprises the usual handle portion 10 and teeth 11. Animal combs of this type are preferably made entirely of metal and the metal teeth are rounded at the ends so as not to pierce or scratch the animal's skin.

In the preferred form of my invention illustrated, the insect trapping or holding means, designated as a whole by A, is attached to an ordinary comb of the type described and extends over approximately one half of the length of the comb, leaving a substantial portion of the comb handle 10 free to serve as a convenient grip for the hand of the operator.

The attachment A is made in the form of a hinge, comprising hinge leaves 12 and 13 coupled together by a hinge pin 14. The leaf 12 of the hinge is secured by any suitable means, such as screws, to a fill plate 15 which in turn is securely attached to the handle 10 of the comb. The inner edge of the plate 15 is in alinement with the corresponding edge of the comb handle 10, and the hinge leaf 12 is so positioned that the axis of the hinge pin 14 will lie directly above the alined edges of the plate 15 and handle 10.

Figure 2:
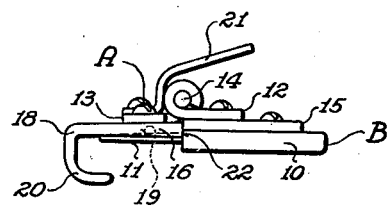
Fig. 2 is a corresponding end elevation.
Figure 3:
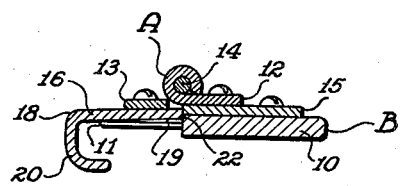
Fig. 3 is a transverse section taken on the line 3—3 of Fig. 1.
Figure 4:
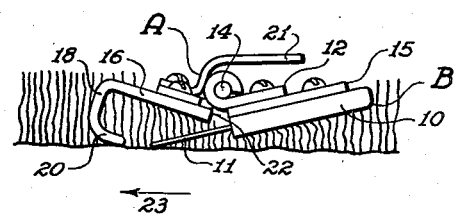
Fig. 4 is an end elevation showing my invention in an operative position during the actual combing of the fur of the animal.

The trapping member 16 is secured to the other leaf of the hinge by any suitable means such as screws. This trapping member comprises a flat plate having a shallow wedge-shaped ridge 19 on the under side at each lateral edge, and a portion 18 in front extending beyond the ends of the teeth 11 of the comb, which portion 18 is notched to provide a series of equally-spaced tines or prongs 20 which are curved downwardly and then inwardly in reverse curve as shown in Figs. 2, 3, and 4. The tips of the prongs 20, when the trapping member 16 is in contact with the teeth 11 of the comb, will lie some distance below the teeth 11 and will be parallel thereto, but when the trapping member 16 is in a raised position, as shown in Fig. 4, the tips of the prongs 20 will clear the tips of the teeth 11.

A spring 17, carried on the hinge pin 14, and having its ends bearing on the hinge leaves 12 and 13, as shown in Fig. 1, normally holds the trapping member 16 in closed position bearing on the tips of teeth 11 and with the end ridges 19 having full bearing on the adjacent teeth. It is important that in this closed position the inner edge 22 of the trapping member should be in abutment with the adjacent edges of the plate 15 and the comb handle 10. In this closed position there will be a slight wedge-shaped space between the under side of the plate of the trapping member 16, lying between the ridges 19, and the teeth 11. A curved arm 21 is attached to the hinge leaf 13 so that downward pressure on the free end of this arm 21 will cause the trapping member 16 to open.

In operation, the comb B is held at a slight angle to the skin of the animal and is moved forward, that is in the direction indicated by the arrow 23 in Fig. 4, with the ends of teeth 11 sliding along the animal's skin through the fur. The bottoms of the curved prongs 20 are also slid along the animal's skin ahead of the teeth 11, pressing lightly on the skin and holding the trapping member 16 in the open position as shown in Fig. 4. The teeth of the comb, in passing through the hair or fur, comb the insects therefrom, and these collect on the surface of the teeth, some of them being shoved up against the edge of the comb handle 10 and plate 15. The instant the comb is lifted from contact with the animal's skin the spring 17 forces the trapping member into closed position. The insects which have been shoved against plate 15 and handle 10 will be crushed by the edge 22 and the rest of the insects collected on the teeth 11 under the trapping member will be held against escape since the plate of the trapping member abuts the tips of the teeth 11 and the ridges 19 close the ends.

When the comb is lifted from the body of the animal it is immersed in water, or preferably in some exterminating liquid. Pressure of the operator's finger on the arm 21 is then exerted to move the trapping member into open position releasing the insects and causing them to be removed from the comb by the liquid. This operation is repeated until the combing of the animal is completed.

I claim:

1. A device of the character described comprising a comb, an insect trapping member hingedly attached to said comb, said member normally resting on said comb and having a downwardly curved finger portion extending beyond and normally below the teeth of said comb, said finger portion serving to raise said member above said teeth when said comb is pressed against the skin of an animal, and means for causing said member to return to normal position when said comb is lifted from the skin of the animal.

2. A device of the character described comprising a comb having a handle and teeth, an insect trapping member hinged to said comb handle, said member normally resting on the teeth of said comb, and having downwardly extending prongs extending beyond and normally below said teeth, said prongs serving to raise said member into open position when said comb is pressed against the skin of an animal, and spring means for causing said member to return to closed position when said comb is lifted from the skin of the animal, thereby holding insects collected between said member and said teeth.

3. In a device of the character described, a comb, an insect trapping member hingedly attached to said comb, said member having downwardly and inwardly curved prongs extending beyond and normally below the teeth of said comb, said prongs serving to raise said member into open position when said comb is being used, and means for causing said member to return to closed position when said comb is not being used.

4. In combination with a comb designed for the combing of animals, an insect trapping member hingedly attached to said comb, said member normally resting on said comb and having a downwardly curved slotted portion extending beyond and normally below the teeth of said comb, said slotted portion serving to raise said member into open position when said comb is pressed against the skin of an animal, and means for causing said member to return to closed position when said comb is lifted from the skin of the animal.

5. In combination with a comb designed for the combing of animals, an insect trapping member hinged to said comb handle, said member normally resting on the teeth of said comb and having downwardly and inwardly curved prongs extending beyond and normally below said teeth, said prongs serving to raise said member above said teeth when said comb is pressed against the skin of an animal, and means for causing said member to return to normal position when said comb is lifted from the skin of the animal, thereby holding insects collected between said member and said teeth.

6. In combination with a comb designed for the combing of animals, an insect trapping member hinged to said comb handle, said member having a flat portion adapted normally to rest on the teeth of said comb and having downwardly extending prongs extending beyond and normally below said teeth, said prongs serving to raise said member above said teeth when said comb is being used, and means for causing said member to return to normal position when said comb is not being used.

7. In a device of the character described, a comb having a handle and teeth, an insect trapping member hinged to said comb handle, said member having a flat portion with an underlying ridge at each end adapted normally to rest on the teeth of said comb and downwardly and inwardly curved prongs extending beyond and normally below said teeth, said prongs serving to raise said member above said teeth when said comb is pressed against the skin of an animal, and spring means for causing said member to return to normal closed position when said comb is removed from contact with the animal, thereby holding insects collected between said member and said teeth.

8. The combination described by claim 7 including an arm for raising said member into open position when it is desired to remove entrapped insects from said device.

GUSTAVUS A. WIKANDER.